United States Patent
Young

[11] Patent Number: 6,030,306
[45] Date of Patent: Feb. 29, 2000

[54] METHOD FOR CHAIN MESHING PHASING ON A V-ENGINE CAMSHAFT DRIVE TO REDUCE NOISE

[75] Inventor: James D. Young, Chesaning, Mich.

[73] Assignee: Cloyes Gear and Products, Inc., Mentor, Ohio

[21] Appl. No.: 09/134,125

[22] Filed: Aug. 14, 1998

Related U.S. Application Data

[60] Provisional application No. 60/055,618, Aug. 14, 1997.

[51] Int. Cl.[7] .............................. F16H 7/08; F16H 7/18; F16H 7/24
[52] U.S. Cl. ..................... 474/111; 474/140; 474/148; 474/150; 474/84
[58] Field of Search ..................................... 474/110, 111, 474/109, 135, 138, 91, 84, 140, 148, 156, 150, 902, 273; 123/90.31, 90.15

[56] References Cited

U.S. PATENT DOCUMENTS

| | | |
|---|---|---|
| 3,455,178 | 7/1969 | Ruoff et al. . |
| 4,553,509 | 11/1985 | Mezger et al. . |
| 4,878,461 | 11/1989 | Sapienza, IV et al. . |
| 5,058,458 | 10/1991 | Odai ................................ 474/84 X |
| 5,116,283 | 5/1992 | Futami et al. ........................ 474/84 |
| 5,295,459 | 3/1994 | Suzuki et al. . |
| 5,366,418 | 11/1994 | Fukushima et al. .................... 474/111 |
| 5,397,280 | 3/1995 | Skurka . |
| 5,427,582 | 6/1995 | Iwao et al. . |
| 5,562,557 | 10/1996 | Ledvina et al. ......................... 474/84 |
| 5,665,019 | 9/1997 | Sheffer et al. . |
| 5,848,948 | 12/1998 | Allen .................................... 474/156 |

FOREIGN PATENT DOCUMENTS

| | | |
|---|---|---|
| 825 360 | 2/1998 | European Pat. Off. . |
| 58-193959 | 2/1984 | Japan . |

*Primary Examiner*—Tamara L. Graysay
*Assistant Examiner*—Marcus Charles
*Attorney, Agent, or Firm*—Fay, Sharpe, Fagan, Minnich & McKee, LLP

[57] ABSTRACT

A chain drive system for use primarily in automotive timing drives, in particular V-type engines and horizontally opposed engines having a separate chain drive for each bank with coaxial crankshaft driving sprockets, wherein the chain meshing for these driving sprockets is staggered from bank-to-bank in order to reduce the chain drive system noise level. This engagement phasing is accomplished by offsetting the taut strand guide of one bank some amount greater than the opposite bank, effectively increasing the chain wrap and thereby compelling a delayed roller-sprocket engagement with respect to the opposite bank. The roller collision during meshing will therefore be phased from bank-to-bank, and the resulting noise levels generated therefrom will be reduced as a result of this phasing.

26 Claims, 5 Drawing Sheets

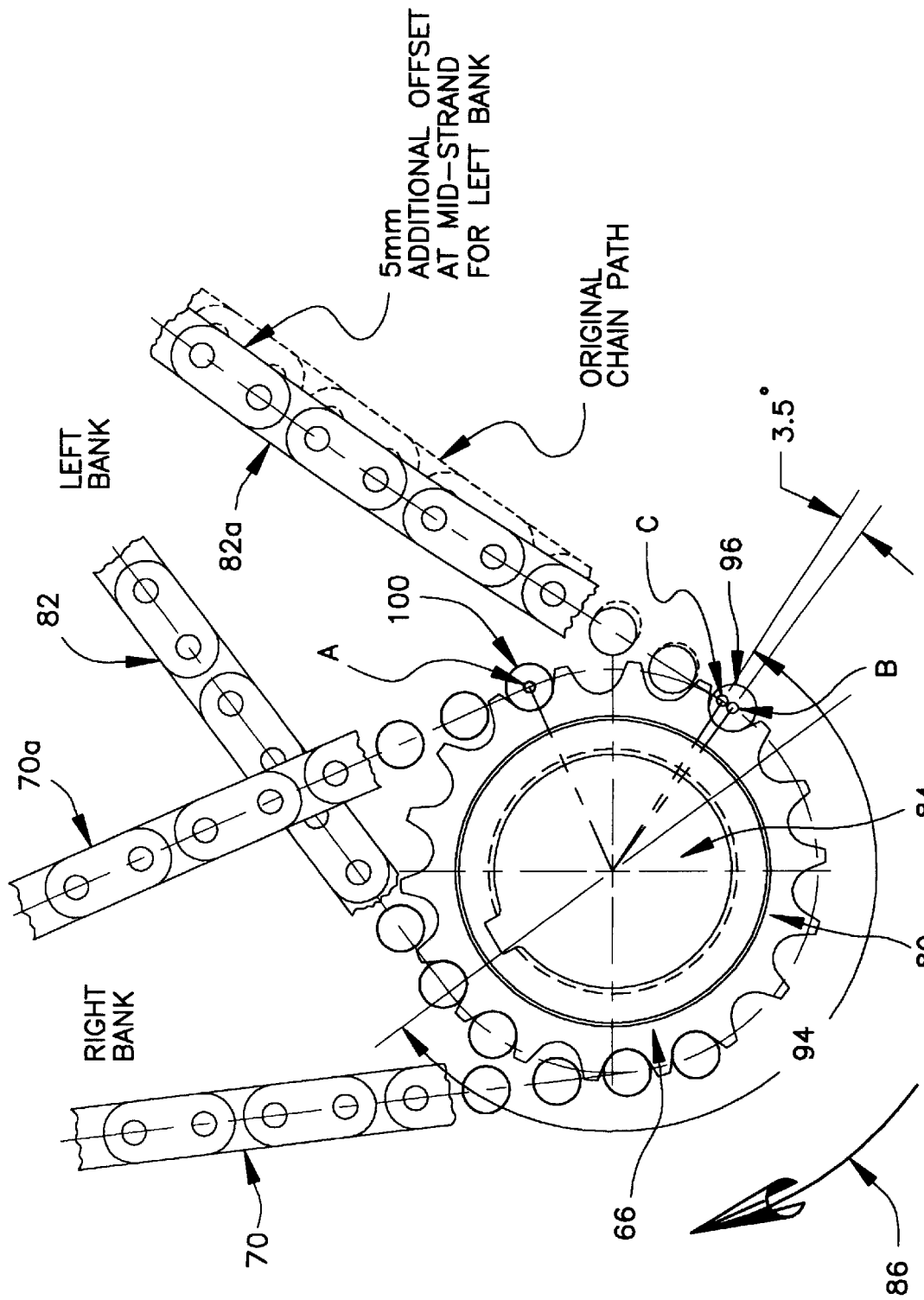

METHOD FOR CHAIN MESHING PHASING ON A V-ENGINE CAMSHAFT DRIVE TO REDUCE NOISE

CROSS REFERENCE TO RELATED APPLICATIONS

This application claims the benefit of U.S. Provisional Patent Application Serial No. 60/055,618, filed Aug. 14, 1997.

BACKGROUND OF THE INVENTION

The present invention relates to timing chain art. It finds particular application in conjunction with a camshaft drive for a V-block engine and will be described with particular reference thereto. However, it should be appreciated that the present invention may also find application in conjunction with other types of chain drive systems and applications where reduced engine noise is advantageous.

In a typical overhead camshaft engine, V-type as well as horizontally-opposed, a separate camshaft chain drive is often utilized for each cylinder bank, and the two drives often have a substantially identical chain drive geometry for each bank. This drive configuration requires the utilization of two coaxial crankshaft sprockets. Alternatively, a single crankshaft sprocket having two sets or rows of teeth can be utilized. The meshing for the crankshaft sprockets is in phase or, in other words, occurs at substantially the same instant for any geometry in which the bank angle is an integer multiple of the tooth angle. It is known that simultaneous roller-sprocket meshing engagement results in higher chain drive noise levels.

FIGS. 1 and 2 illustrate the geometry for a typical V-type engine camshaft chain drive system 8 having an exemplary bank angle α of approximately 60°. A right-hand cylinder bank drive 10 includes driven intake camshaft sprocket 12 and exhaust camshaft sprocket 14, crankshaft drive sprocket 16, and chain 20. Likewise, a left-hand cylinder bank drive 22 includes driven intake camshaft sprocket 24 and exhaust camshaft sprocket 26, crankshaft drive sprocket 30, and chain 32. In the described embodiment, the camshaft sprockets 12, 14, 24, 26 are 36-tooth sprockets. The crankshaft sprockets 16, 30 are secured to a crankshaft 34 in an in-line or co-axial configuration. The crankshaft 34, and hence sprockets and chains rotate in the direction of arrow 36.

A first chain guide 40 positions or otherwise guides a taut strand 20a of the chain 20 along a fixed arcuate path between the intake sprocket 12 and the crankshaft sprocket 16. Likewise, a second chain guide 42 positions or otherwise guides a taut strand 32a of the chain 32 along a fixed arcuate path between the exhaust sprocket 26 and the crankshaft sprocket 30. The chain paths for each bank 10, 22 are substantially identical, with both taut strands 20a, 32a having the same curvature (i.e. radius) and tangent offset 43.

The tangent offset is a measure of how far a midpoint of the taut strand 32a is offset from a line 44 tangent to the outermost edges of the chain links that are wrapped about each sprocket 26, 30. Thus, the tangent offset of the taut-strand 20a is substantially equal to the tangent offset of the taut-strand 32a. The bank drives 10, 22 also include conventional tensioners and tensioner arms that act on the chains to produce the required chain strand control.

As shown more clearly in FIG. 2, the sprocket teeth of the crankshaft sprockets 16, 30 are conventionally in phase (i.e. no circumferential offset therebetween). The taut-strand rollers of chain 20 successively mesh or otherwise engage with the crankshaft sprocket 16 at a fixed location A, and the taut-strand rollers of chain 32 successively mesh with the sprocket 30 at a fixed location B. The meshing engagement point B is offset from the meshing engagement point A by an angle substantially equal to the bank angle α or, in this case, 60°. Although the roller-sprocket meshing points A, B are offset, roller-sprocket meshing for both banks occur at substantially the same instant in time which, as previously mentioned, results in higher chain drive noise levels.

One solution to the problem of higher chain drive noise levels is to shift or phase the roller-sprocket meshing for the crankshaft sprocket of one bank with respect to its counterpart for the opposite bank so that the roller-sprocket collisions do not occur at substantially the same instant in time. FIG. 3 illustrates a known chain drive arrangement wherein the sprocket teeth of the coaxial crankshaft sprockets 16, 30 are phased to achieve bank-to-bank roller-sprocket meshing phasing of one-half pitch.

In other words, the 18-tooth (where N=18) crankshaft sprockets—which have tooth angles of 360°/N or 20°—have a bank-to-bank meshing phasing of 10°. Thus, a roller 46 of chain 20 is fully engaged with the sprocket 16 at engagement point A, while a roller 50 of chain 32 is still 10° from meshing with the sprocket 30. The roller 50 does not fully engage with the sprocket 30 until the crankshaft sprockets 16, 30 rotate an additional one-half pitch or 10° in the direction of arrow 36 to engagement point B. Thus, the engagement impacts for each bank are staggered in time and the resultant chain drive noise is reduced.

SUMMARY OF THE INVENTION

The principal object of the present invention is to provide a camshaft drive system that shifts or phases the roller-sprocket meshing for a crankshaft sprocket of one cylinder bank with respect to a counterpart crankshaft sprocket of the other cylinder bank without offsetting one crankshaft sprocket relative to the other. This is accomplished by shifting or phasing (i.e. staggering) the roller-sprocket meshing for the crankshaft sprocket of one bank with respect to its counterpart for the opposite bank so that the roller-sprocket collisions do not occur at substantially the same instant in time. Roller meshing and the noise levels associated with roller meshing will therefore be staggered or phased, effectively reducing the overall noise generation.

To achieve meshing stagger, the present invention beneficially utilizes the taut strand chain guides that are typically essential components for overhead cam engines. In particular, the roller-sprocket meshing stagger bank-to-bank is accomplished by using the chain guides to displace the taut strand of one bank a greater amount than the opposite bank.

Thus, in accordance with one aspect of the present invention, a chain drive system is disclosed. The chain drive system includes a first drive assembly for a first cylinder bank. The first drive assembly includes a first drive sprocket, a first driven sprocket, and a first drive chain coupling the first drive sprocket to the first driven sprocket. A taut strand of the first drive chain is displaced along a first arcuate path between the first drive sprocket and the first driven sprocket. A second drive assembly for a second cylinder bank includes a second drive sprocket, a second driven sprocket, and a second drive chain coupling the second drive sprocket to the second driven sprocket. A taut strand of the second drive chain is displaced along a second arcuate path between the second drive sprocket and the second driven sprocket. The taut strand of the first drive chain being displaced more than the taut strand of the second drive chain to phase the roller-sprocket meshing of the drive sprockets relative to the drive chains.

In accordance with another aspect of the present invention, a method of reducing the noise generated by roller-sprocket impacts of a chain drive system is disclosed. The chain drive system includes a first drive assembly for a first cylinder bank. The first drive assembly includes a first drive sprocket, a first driven sprocket, and a first drive chain coupling the first drive sprocket to the first driven sprocket. A taut strand of the first drive chain is displaced along a first arcuate path between the first drive sprocket and the first driven sprocket. A second drive assembly for a second cylinder bank includes a second drive sprocket, a second driven sprocket, and a second drive chain coupling the second drive sprocket to the second driven sprocket. A taut strand of the second drive chain is displaced along a second arcuate path between the second drive sprocket and the second driven sprocket. The method includes the steps of positioning a first chain guide to displace the first taut strand along the first arcuate path, and positioning the second chain guide to displace the second taut strand along the second arcuate path, the first taut strand being displaced more than the second taut strand to phase the roller-sprocket meshing of the drive sprockets relative to the drive chains.

An advantage of the present invention is the provision of a chain drive system which reduces the noise generated by roller-sprocket impacts of a chain drive system.

Further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

FIG. 5 is an enlarged view of the in-line crankshaft sprockets of the chain drive system of FIG. 4.

DETAILED DESCRIPTION OF THE PREFERRED EMBODIMENT

Figure 1:
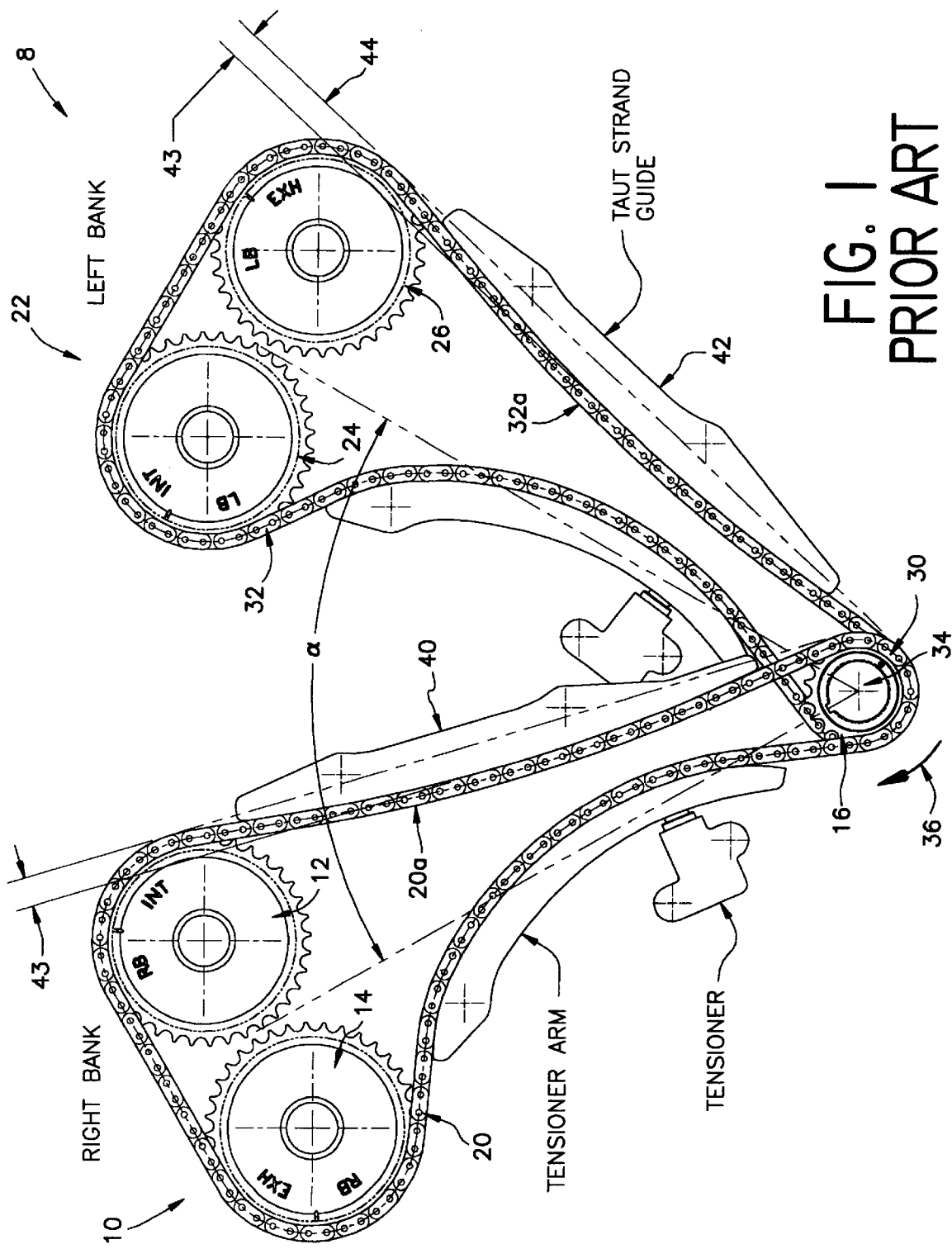
FIG. 1 illustrates a conventional V-type engine camshaft chain drive system.
Figure 4:
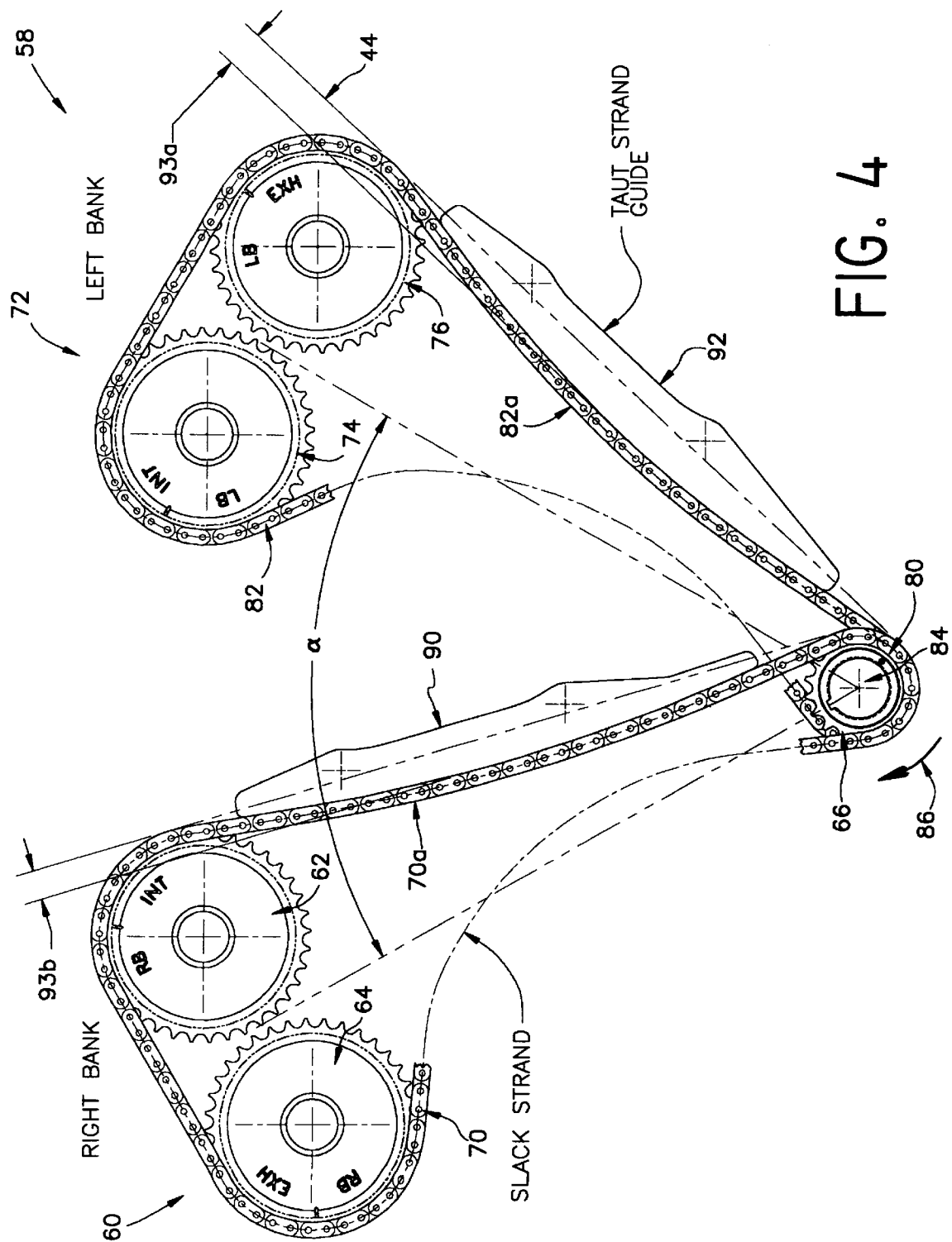
FIG. 4 is a V-type engine camshaft chain drive system according to the present invention.

Referring now to FIGS. 4 and 5, a V-type engine camshaft chain drive system 58, similar to the chain drive system 8 (FIG. 1), includes a right-hand cylinder bank drive 60 having driven intake camshaft sprocket 62 and exhaust camshaft sprocket 64, crankshaft drive sprocket 66, and roller chain 70. Likewise, a left-hand cylinder bank drive 72 includes driven intake camshaft sprocket 74 and exhaust camshaft sprocket 76, crankshaft drive sprocket 80, and roller chain 82. Alternatively, the crankshaft sprockets 66, 80 can be replaced with a single crankshaft sprocket, such as a molded, powdered metal crankshaft sprocket having two sets or rows of teeth in the orientation described further below.

Figure 2:
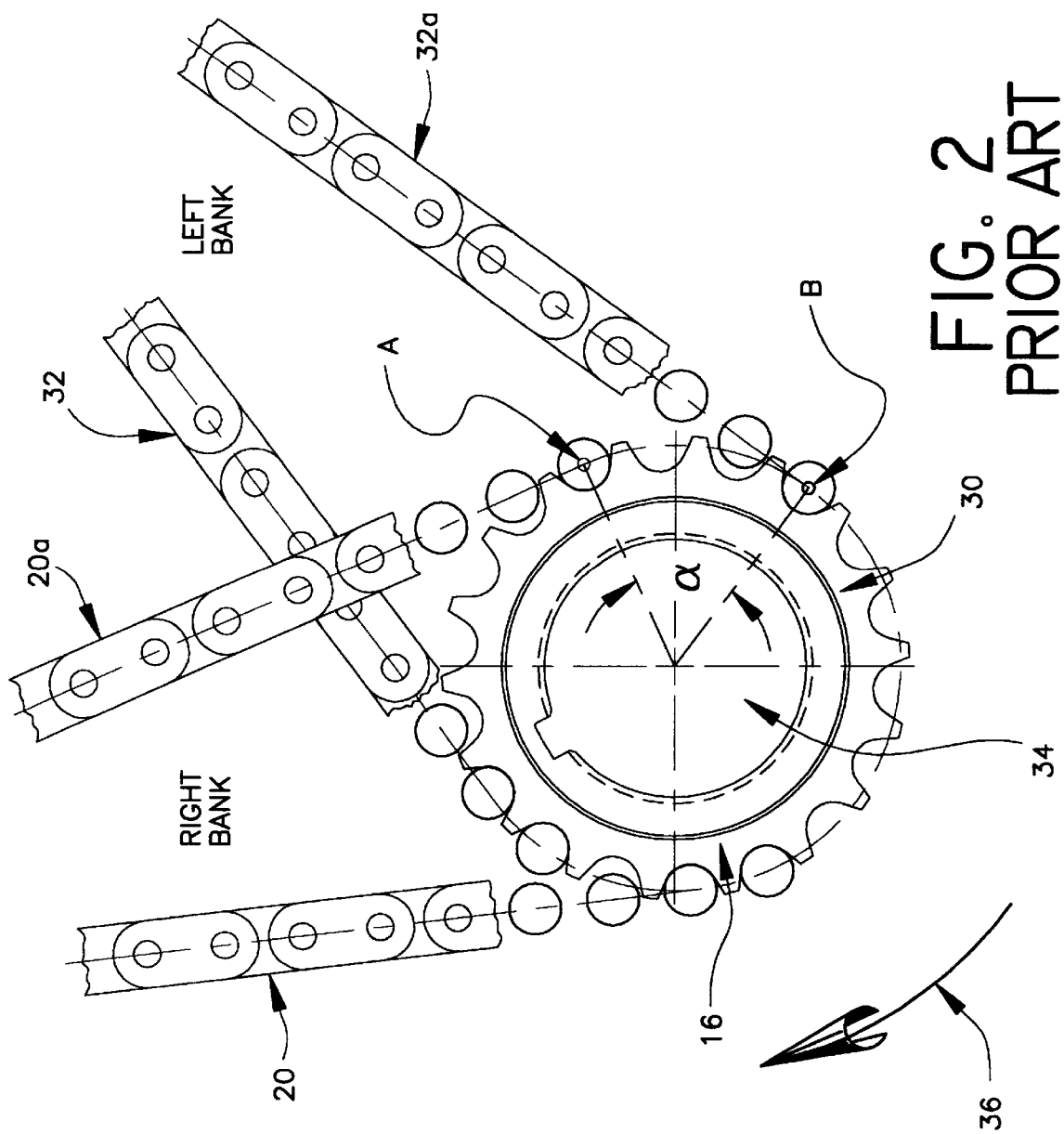
FIG. 2 is an enlarged view of the in-line crankshaft sprockets of the chain drive system of FIG. 1 wherein the sprocket teeth of one crankshaft sprocket are aligned with the sprocket teeth of the other crankshaft sprocket.
Figure 3:
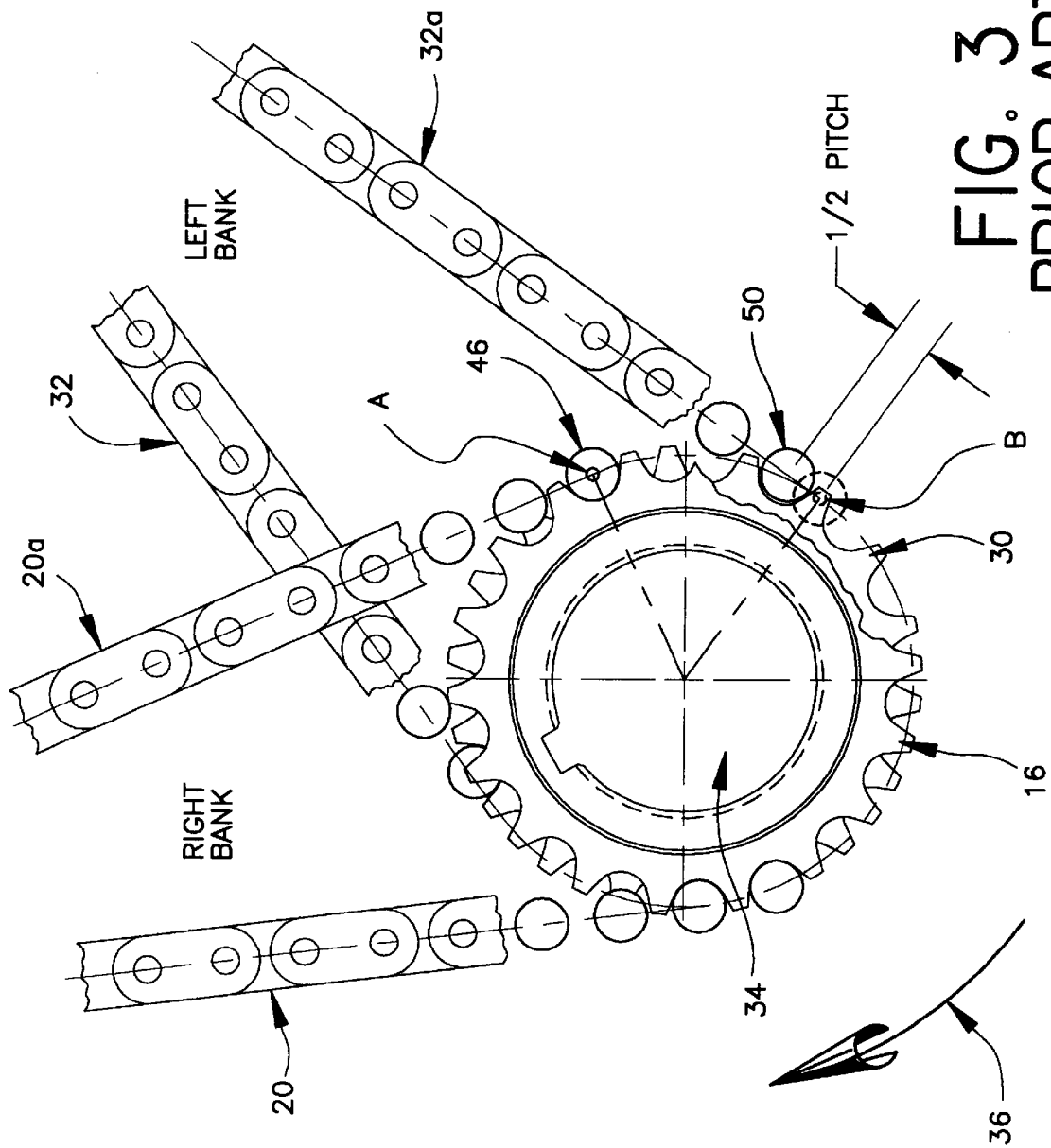
FIG. 3 is an enlarged view of an alternate in-line crankshaft sprocket arrangement for the chain drive system of FIG. 1 wherein the sprocket teeth of one crankshaft sprocket are offset or shifted relative to the sprocket teeth of the other crankshaft sprocket.

In the described embodiment, the camshaft sprockets 62, 64, 74, 76 are 36-tooth sprockets and the crankshaft sprockets 66, 80 are 18-tooth sprockets. The crankshaft sprockets 66, 80 are secured or keyed to a crankshaft 84 in an in-line or co-axial configuration. As shown in FIG. 5, the sprocket teeth of the crankshaft sprockets 66, 80 are conventionally in phase (i.e. no circumferential offset therebetween) similar to the crankshaft sprocket arrangement of FIG. 2. The crankshaft 84, and hence sprockets and chains rotate in the direction of arrow 86.

Referring again to FIG. 4, a first chain guide 90 positions or otherwise guides a taut strand 70a of the chain 70 along a fixed arcuate path between the intake sprocket 62 and the crankshaft sprocket 66. Likewise, a second chain guide 92 positions or otherwise guides a taut strand 82a of the chain 82 along a fixed arcuate path between the exhaust sprocket 76 and the crankshaft sprocket 80.

The taut-strand chain guides 90, 92 are beneficially utilized to achieve the desired meshing stagger. In particular, the roller-sprocket meshing stagger, bank-to-bank, is accomplished by using the chain guides 90, 92 to displace or offset the taut-strand of one bank drive a greater amount than the taut-strand of the other bank drive. Thus, the tangent offset of one taut-strand is greater than the tangent offset of the other taut-strand.

For example, the chain guide 92 displaces the taut-strand 82a of chain 82 a greater amount than the chain guide 90 displaces the taut-strand 70a of chain 70. That is, the tangent offset 93a for taut-strand 82a is greater than the tangent offset 93b for the taut strand 70a. In the embodiment being described, the tangent offset 93a for taut-strand 82a is about 5.0 mm greater than the tangent offset 93b for the taut strand 70a. Thus, the taut-strand chain paths for each bank 60, 72 are not identical, with both taut strands 70a, 82a having a different curvature (i.e. radius) and tangent offset.

As shown in FIG. 5, the increased tangent offset 93a for taut-strand 82a results in an increased chain wrap 94 (measured in degrees/radians) around the crankshaft sprocket 80 relative to the chain wrap around sprocket 66. The result is that the roller-sprocket meshing point for the left bank drive 72 is shifted from Point B to Point C which serves to advance the roller-sprocket meshing for the left bank drive 72 with respect to the right bank drive 60. In the embodiment being described, a 5.0 mm tangent offset differential between the taut-strands 70a and 82a results in a meshing stagger angle between points B and C of about 3.5°.

Thus, the taut-strand rollers of chain 82 successively mesh or otherwise engage with the crankshaft sprocket 80 at the meshing engagement point C, and the taut-strand rollers of chain 70 successively mesh or engage with the sprocket 66 at the meshing engagement point A, which point A is angularly offset from point C by less than the bank angle α. However, the meshing engagement point A is offset from point B by the bank angle α or, in the described embodiment, about 60°.

As a result, a roller 96 of chain 82 engages with the sprocket 80 at engagement point C, while, at the same instant, a roller 100 of chain 70 is 3.5° away from meshing with the roller 66 at point A. The roller 100 does not fully engage (i.e. impact) with the sprocket 66 until the crankshaft sprockets 66, 80 are rotated 3.5° in the direction of arrow 86 and the roller 96 is advanced to point B. Thus, the engagement impacts for each bank are staggered in time and the resultant chain drive noise is reduced.

The differential between the taut-strand tangent offsets or displacements is achieved by offsetting the chain guide 92 by a relatively small additional amount (about 3.0 mm to about 7.0 mm) compared to the chain guide 90. An optimized meshing stagger angle must be determined for each drive, but about 3° to about 5° meshing stagger can be reasonably attained with only a modest guide offset differential from bank-to-bank.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

For instance, the present "tangent offset" method to increase chain wrap in order to advance roller meshing can also be beneficially used in chain drive arrangements having three or more sprockets to phase the meshing of the driven sprockets so that none of the sprockets will have their meshing in phase with each other or, in other words, occurring at substantially the same instant.

Also, it is contemplated that the chain guide 90 can be offset by a relatively small additional amount (about 3.0 mm to about 7.0 mm) relative to the chain guide 92 in order to shift the roller-sprocket engagement point A rather than the roller sprocket engagement point B. It is also contemplated that the relative thickness of the chain guides 90, 92 can be varied to effect a differential between the taut-strand tangent offsets. In particular, the chain guide 92 can be about 3.0 mm to about 7.0 mm thicker than the thickness of the chain guide 90 in order to effect the bank-to-bank staggered impact meshing of the present invention.

Further, the present invention is equally effective in reducing the meshing impact noise associated with inverted tooth chain drive systems. In addition to the NVH (noise, vibration, and harshness) benefit, another advantage of this invention is that the crankshaft sprockets can be common from bank to bank for many applications.

It is also contemplated that the drive sprockets of the present invention need not be in-line or coaxial on the same shaft, such as with compound chain drive systems. It is also contemplated that a single crankshaft sprocket can be used in place of separate sprockets.

Thus, the present invention contemplates a chain drive system for use primarily in automotive timing drives, in particular V-type engines and horizontally opposed engines having a separate chain drive for each bank with coaxial crankshaft driving sprockets, wherein the chain meshing for these driving sprockets is staggered from bank-to-bank in order to reduce the chain drive system noise level.

This engagement phasing is accomplished by offsetting the taut strand chain guide of one bank some amount greater than the opposite bank, effectively increasing the chain wrap and thereby advancing the roller-sprocket engagement with respect to the opposite bank. The roller collision during meshing will therefore be phased from bank-to-bank, and the resulting noise levels generated therefrom will be reduced as a result of this phasing.

Having thus described the preferred embodiment(s), the invention is now claimed to be:

1. A chain drive system comprising:
    a first drive assembly for a first cylinder bank, the first drive assembly including a first drive sprocket, a first driven sprocket, and a first drive chain coupling the first drive sprocket to the first driven sprocket, a taut strand of the first drive chain being displaced along a first arcuate path between the first drive sprocket and the first driven sprocket;
    a second drive assembly for a second cylinder bank, the second drive assembly including a second drive sprocket, a second driven sprocket, and a second drive chain coupling the second drive sprocket to the second driven sprocket, a taut strand of the second drive chain being displaced along a second arcuate path between the second drive sprocket and the second driven sprocket; and
    the taut strand of the first drive chain being displaced more than the taut strand of the second drive chain to phase a roller-sprocket meshing of the first drive sprocket and first drive chain relative to a roller-sprocket meshing of the second drive sprocket and second drive chain.

2. The chain drive system of claim 1, wherein the first and second drive chains are roller chains.

3. The chain drive system of claim 1, wherein the first and second drive chains are inverted tooth chains.

4. The chain drive system of claim 1 wherein the first and second drive sprockets are secured to a crankshaft in a coaxial arrangement.

5. The chain drive system of claim 1 wherein the first and second driven sprockets are camshaft sprockets.

6. The chain drive system of claim 1, wherein the first drive assembly includes a third driven sprocket coupled to the first driven sprocket and first drive sprocket by the first drive chain, and the second drive assembly includes a fourth driven sprocket coupled to the second driven sprocket and second drive sprocket by the second drive chain.

7. The chain drive system of claim 1, wherein the first taut strand is displaced by a first chain guide and the second taut strand is displaced by a second chain guide.

8. The chain drive system of claim 7, wherein the first chain guide is offset relative to the second chain guide by about 3.0 mm to about 7.0 mm.

9. The chain drive system of claim 1, wherein the displacement of the first drive chain taut strand increases a wrap angle around the first drive sprocket by about 3.0° to about 5.0°.

10. The chain drive system of claim 1, wherein the displacement of the first drive chain taut strand advances the roller-sprocket meshing of the first drive sprocket and first drive chain relative to the roller-sprocket meshing of the second drive sprocket and second drive chain.

11. The chain drive system of claim 1, wherein the first drive sprocket includes a first plurality of teeth and the second drive sprocket includes a second plurality of teeth, the first plurality of teeth being circumferentially aligned or in-phase with the second plurality of teeth.

12. The chain drive system of claim 1, wherein a tangent offset of the first chain taut strand is greater than a tangent offset of the second chain taut strand.

13. The chain drive system of claim 1, wherein the first and second drive sprockets are formed as a single drive sprocket having a first row of sprocket teeth and a second row of sprocket teeth.

14. A method of reducing the noise generated by roller-sprocket impacts of a chain drive system including a first drive assembly for a first cylinder bank and a second drive assembly for a second cylinder bank, the first drive assembly including a first drive sprocket, a first driven sprocket, and a first drive chain coupling the first drive sprocket to the first driven sprocket, a taut strand of the first drive chain being displaced along a first arcuate path between the first drive sprocket and the first driven sprocket, and the second drive assembly including a second drive sprocket, a second driven sprocket, and a second drive chain coupling the second drive sprocket to the second driven sprocket, a taut strand of the second drive chain being displaced along a second arcuate path between the second drive sprocket and the second driven sprocket, the method comprising the steps of:

positioning a first chain guide to displace the first taut strand along the first arcuate path; and positioning the second chain guide to displace the second taut strand along the second arcuate path, the first taut strand being displaced more than the second taut strand to phase a roller-sprocket meshing of the first drive sprocket and first drive chain relative to a roller-sprocket meshing of the second drive sprocket and second drive chain.

15. The method of claim 14, wherein the first and second drive chains are roller chains.

16. The method of claim 14, wherein the first and second drive chains are inverted tooth chains.

17. The method of claim 14 wherein the first and second drive sprockets are secured to a crankshaft in a coaxial arrangement.

18. The method of claim 14 wherein the first and second driven sprockets are camshaft sprockets.

19. The method of claim 14, wherein the first drive assembly includes a third driven sprocket coupled to the first driven sprocket and first drive sprocket by the first drive chain, and the second drive assembly includes a fourth driven sprocket coupled to the second driven sprocket and second drive sprocket by the second drive chain.

20. The method of claim 14, wherein the first chain guide is offset relative to the second chain guide by about 3.0 mm to about 7.0 mm.

21. The method of claim 14, wherein the displacement of the first drive chain taut strand increases a wrap angle around the first drive sprocket by about 3.0° to about 5.0°.

22. The method of claim 14, wherein the displacement of the first drive chain taut strand advances the roller-sprocket meshing of the first drive sprocket and first drive chain relative to the roller-sprocket meshing of the second drive sprocket and second drive chain.

23. The method of claim 14, wherein the first drive sprocket includes a first plurality of teeth and the second drive sprocket includes a second plurality of teeth, the first plurality of teeth being circumferentially aligned or in-phase with the second plurality of teeth.

24. The method of claim 14, wherein a tangent offset of the first chain taut strand is greater than a tangent offset of the second chain taut strand.

25. A chain drive system comprising:

a first drive assembly for a first cylinder bank, the first drive assembly including a first drive sprocket, a first driven sprocket, and a first chain coupling the first drive sprocket to the first driven sprocket, a slack strand of the first chain extending between mutual first sides of the first drive sprocket and the first driven sprocket and a taut strand of the first chain extending between mutual second sides of the first drive sprocket and the first driven sprocket, a first reference plane being tangent to the first drive sprocket and the first driven sprocket along the mutual second sides of the first drive sprocket and the first driven sprocket, and the taut strand of the first chain being displaced from the first reference plane by a first maximum distance;

a second drive assembly for a second cylinder bank, the second drive assembly including a second drive sprocket, a second driven sprocket, and a second chain coupling the second drive sprocket to the second driven sprocket, a slack strand of the second chain extending between mutual first sides of the second drive sprocket and the second driven sprocket and a taut strand of the second chain extending between mutual second sides of the second drive sprocket and the second driven sprocket, a second reference plane being tangent to the second drive sprocket and the second driven sprocket along the mutual second sides of the second drive sprocket and the second driven sprocket, and the taut strand of the second chain being displaced from the second reference plane by a maximum second distance; and the first maximum distance being greater than the second maximum distance to stagger the timing of impacts between the first drive sprocket and first chain relative to impacts between the second drive sprocket and the second chain.

26. The chain drive system of claim 25, wherein the first taut strand is displaced by a first chain guide and the second taut strand is displaced by a second chain guide.

\* \* \* \* \*